US007497154B2

(12) United States Patent
Delfini et al.

(10) Patent No.: US 7,497,154 B2
(45) Date of Patent: Mar. 3, 2009

(54) HAND-GUIDED POWER RECIPROCATING SAW

(75) Inventors: Stefano Delfini, Bettlach (CH); Daniel Saegesser, Langenthal (CH); Thomas Ruoff, Kaempfelbach-Bilfingen (DE)

(73) Assignee: Robert Bosch GmbH, Stuttgart (DE)

( * ) Notice: Subject to any disclaimer, the term of this patent is extended or adjusted under 35 U.S.C. 154(b) by 290 days.

(21) Appl. No.: 11/229,742

(22) Filed: Sep. 19, 2005

(65) Prior Publication Data

US 2006/0060054 A1 Mar. 23, 2006

(30) Foreign Application Priority Data

Sep. 21, 2004 (DE) ....................... 10 2004 045 623

(51) Int. Cl.
*B26D 7/26* (2006.01)
*B23D 49/00* (2006.01)

(52) U.S. Cl. .................. 83/698.11; 83/699.21; 30/392; 30/394

(58) Field of Classification Search .............. 83/698.11, 83/698.31, 699.21; 30/392–394, 289, 241, 30/369
See application file for complete search history.

(56) References Cited

U.S. PATENT DOCUMENTS 5,644,847 A * 7/1997 Odendahl et al. ............. 30/394
2002/0178591 A1 12/2002 Hecht et al.
2005/0000098 A1 1/2005 Delfini et al.
2006/0042445 A1 * 3/2006 Delfini et al. ............ 83/699.21

FOREIGN PATENT DOCUMENTS

DE 101 19 561 A1 10/2002
GB 2 300 145 10/1996
WO 02/22297 A1 3/2002
WO 03/106087 12/2003

* cited by examiner

*Primary Examiner*—Boyer D Ashley
*Assistant Examiner*—Omar Flores-Sánchez
(74) *Attorney, Agent, or Firm*—Michael J. Striker

(57) ABSTRACT

A hand-guided power reciprocating saw has a machine housing, a saw blade drivable by a motor into a stroke motion, a guide device having two guide elements resting against the saw blade at opposite sides of the saw blade and operative for guiding and supporting the saw blade crosswise to a sawing direction, the guiding device further having a two-armed pivot lever with lever arms on each of which a corresponding one of the guide elements is situated, the guiding device also having an adjusting mechanism for adjusting a transverse spacing between the guide elements, a holder in which the guide device is integrated and which is configured to be mounted in the machine housing and/or to a base plate attached to the machine housing, the pivot lever being pivotally supported on the holder and the adjusting mechanism being accommodated in the holder.

2 Claims, 4 Drawing Sheets

Fig. 1
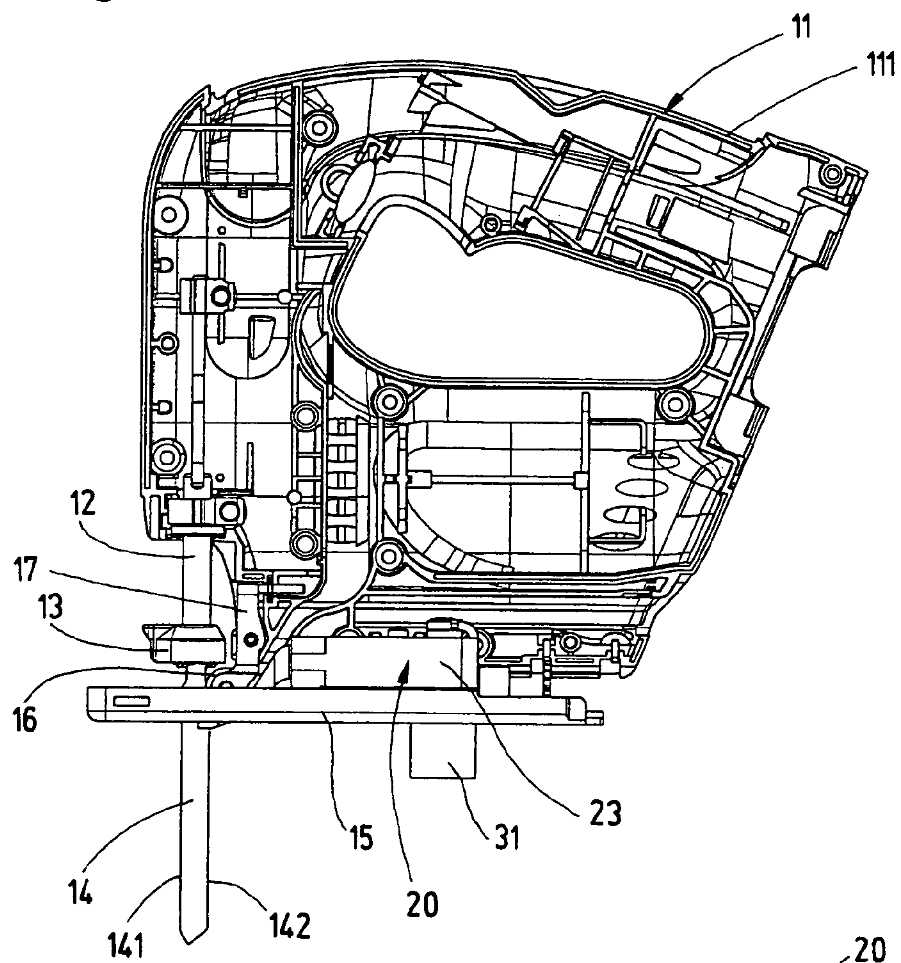
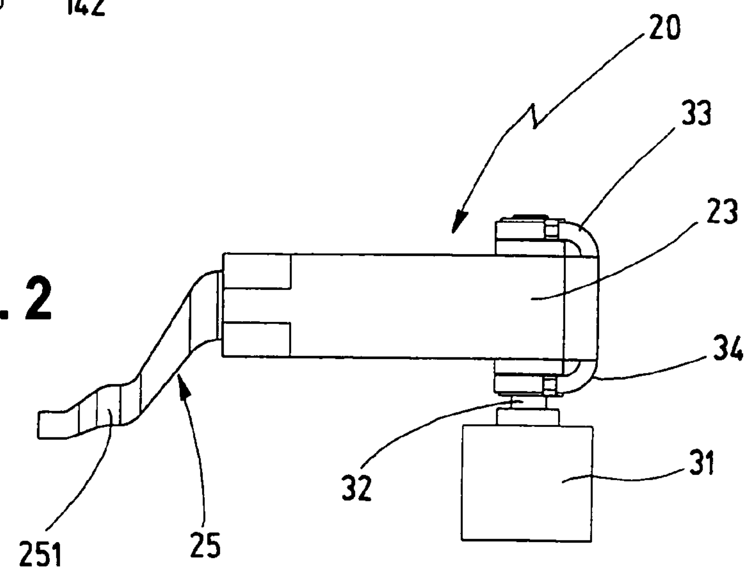
Fig. 2

Fig. 7
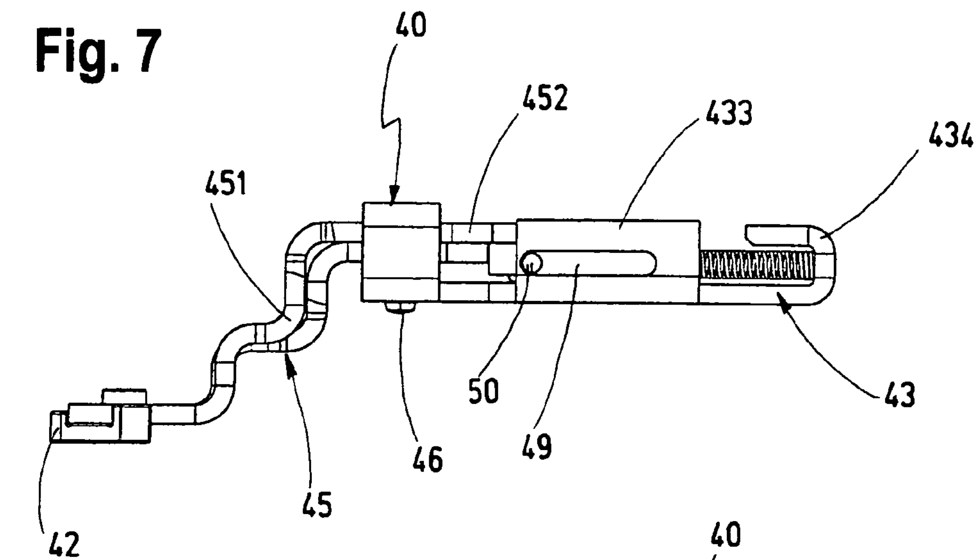
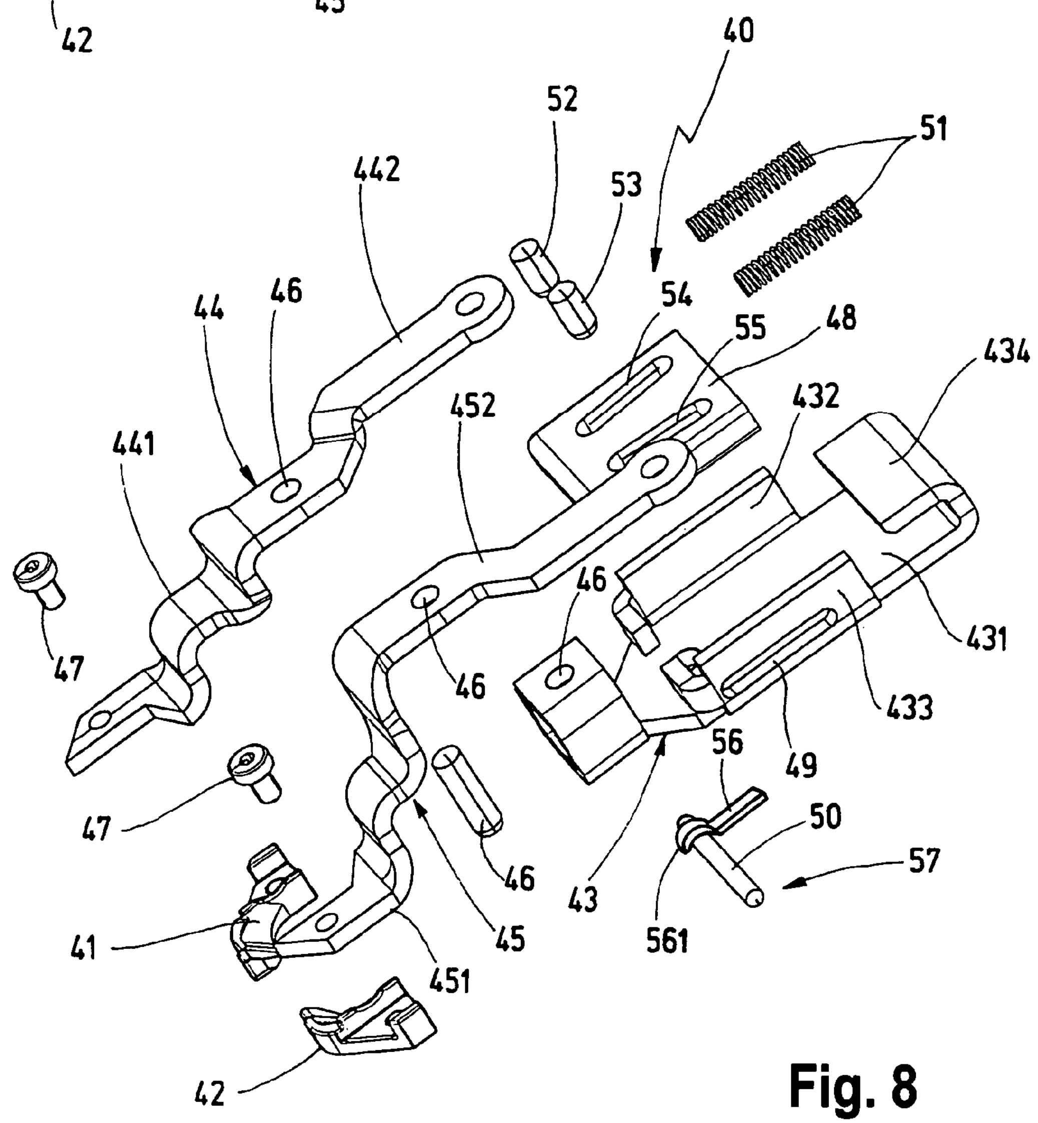
Fig. 8

HAND-GUIDED POWER RECIPROCATING SAW

CROSS-REFERENCE TO RELATED APPLICATIONS

This application claims priority under 35U.S.C. 119(a)-(d) to German patent Application DE 10 2004 045623.2,filed 09/21/2004.

BACKGROUND OF THE INVENTION

The present invention is based on a hand-guided power reciprocating saw.

A known, hand-guided power reciprocating saw referred to as a compass saw (DE 101 19 561 A1) has an oscillating device with a U-shaped holder attached to the housing of the compass saw and a support roller situated between the holder legs, which supports the spine of the saw blade. The support roller is provided with a V-shaped groove that accommodates the spine of the saw blade. In order to prevent a lateral deflection of the oscillating device crosswise to the sawing direction during sawing, a guide mechanism is provided that is fastened to the housing of the compass saw or to a base plate that serves to support the compass saw on the work piece to be sawed. The guide mechanism is embodied as fork-shaped and at the fork ends, supports guide jaws oriented toward each other, which engage the holder of the oscillating device, in the region of the holder in which the support roller is situated.

A known hand-guided saber saw (WO 02/22297 A1) has a support device with a support roller that supports the saw blade spine of the saw blade in the sawing direction and can be driven to oscillate as needed in the sawing direction. In order to prevent a lateral deflection of the saw blade crosswise to the sawing direction during sawing, the saber saw has a guide device that is for guiding and laterally supporting the saw blade; this guide device has two guide elements resting against opposite sides of the saw blade and has a servomotor embodied in the form of a spring drive that is able to adjust the distance between the guide elements to the thickness of the saw blade. The guide device is integrated into the machine housing and has a pair of tong-like pivot arms that protrude from the machine housing in front of the saw blade in the sawing direction. The guide elements situated at the ends of the tongs grasp the saw blade above the base plate by means of their through opening for the saw blade. A clamping device that holds the saw blade is coupled to the guide device so that the guide elements lift away from the saw blade when the clamping device opens and are placed against the sides of the saw blade when the clamping device closes. The guide elements are embodied in the form of roller bodies or ceramic parts, each of which is situated on the one pivot arm of the two-armed tong pivot arms. The tong pivot arms are connected by means of a joint and, with guide bolts that protrude from their pivot arms at the end oriented away from the guide elements, engage in grooves that are situated in a bearing component and diverge from each other in a slightly oblique fashion at an angle of less than 6°. When the bearing component is slid, the tong pivot arms are pivoted via the guide bolts and the sides of the grooves. Two compression springs engage the bearing component and load the bearing component in the longitudinal direction of the saw blade, transmitting a force to the tong pivot arms via the grooves and guide bolts so that the guide elements on the tong pivot arms rest against the sides of the saw blade with a prestressing spring force.

SUMMARY OF THE INVENTION

It is therefore an object of the present invention to provide a hand-guided power reciprocating saw which is a further improvement of the existing saws of this type.

In keeping with these objects and with others which will become apparent hereinafter, one feature of the present invention resides, briefly stated, in a hand-guided power reciprocating saw, comprising a machine housing; a saw blade drivable by a motor into a stroke motion; a guide device having two guide elements resting against said saw blade at opposite sides of said saw blade and operative for guiding and supporting said saw blade crosswise to a sawing direction, said guiding device further having a two-armed pivot lever with lever arms on each of which a corresponding one of said guide elements is situated, said guiding device also having an adjusting mechanism for adjusting a transverse spacing between said guide elements; a holder in which said guide device is integrated and which is configured to be mounted in said machine housing and/or to a base plate attached to said machine housing, said pivot lever being pivotally supported on said holder and said adjusting mechanism being accommodated in said holder.

The hand-guided power reciprocating saw according to the present invention has the advantage that the guide device is a separate component that can be inserted into the machine housing and is not operatively coupled to the other components in the machine housing. It is thus possible to offer the guide device as an option in the form of a separate attachment and to thus upgrade the hand-guided power reciprocating saw according to the modular principle. The guide device is suited for laterally guiding and supporting all saw blades with the same quality of action, independent of their saw blade thickness, since the distance of the guide elements from each other is adjustable, permitting the contacting force of the guide elements to be kept constant for all saw blades. Lateral forces acting on the saw blade during sawing are unable to shift the guide elements.

According to an advantageous embodiment form of the present invention, the adjusting mechanism has a rotatable adjusting cam with a radius that varies over its circumference, against which the lever arms of the pivot levers oriented away from the guide elements rest under the influence of a spring force. The spring force is exerted by a torsion spring, which is situated in clothespin fashion, in the form of a helical spring between the lever arms and, with its spring legs, embraces the back sides of the lever arms oriented away from each other. This structural design achieves an inexpensive production of the guide device.

According to an advantageous embodiment form of the present invention, in order to move the adjusting cam, which is preferably embodied with an oval cross section, a knob is coupled to it by means of a slip clutch or overload clutch. The provision of the slip clutch assures the optimum contact force of the guide elements against the saw blade, independent of its saw blade thickness.

According to an advantageous embodiment of the present invention, the adjusting mechanism has a slider loaded by compression springs that is guided so that it can slide longitudinally in the holder. The lever arms of the pivot levers oriented away from the guide elements are each coupled to oblique slots in the slider by means of a respective pin/slot connection. The slider is spring-loaded in the sliding direction so that the guide elements are pressed against the saw blade with a definite compressive force. During sawing, forces acting on the saw blade that exert a force on the guide elements are transmitted directly into the slots in the slider by the respective pivot lever. Because the acute angle enclosed by the slots is very small and preferably is approximately 10°, the force component along the longitudinal axis of the slider is insufficient to cause it to move. The pivoting levers are thus prevented from moving and the holder absorbs the forces acting on the saw blade.

According to an advantageous embodiment form of the present invention, the guide mechanism has a locking mechanism for locking the slider in a parked position in which the guide elements are lifted away from the saw blade. The parked position is reached by manually sliding the slider by means of a bolt that protrudes laterally from the holder and is embraced in the parked position by a locking lever. If the saw blade is changed, then, after the locking lever is released, the spring-loaded slider, acting by means of the pin/slot connection and the pivot levers, presses the guide elements against the saw blade again.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of a hand-guided power reciprocating saw without a transmission-equipped drive unit, with the housing open, a base plate installed, a saw blade clamped in place, and a guide device for the saw blade mounted in the housing, FIG. 2 is an enlarged side view of the guide device for the saw blade shown in FIG. 1, FIG. 7 is a side view of the guide device shown in FIG. 6, FIG. 8 is an exploded view of the guide device according to FIGS. 6 and 7.

DESCRIPTION OF THE PREFERRED EMBODIMENTS

Figures 3, 4:
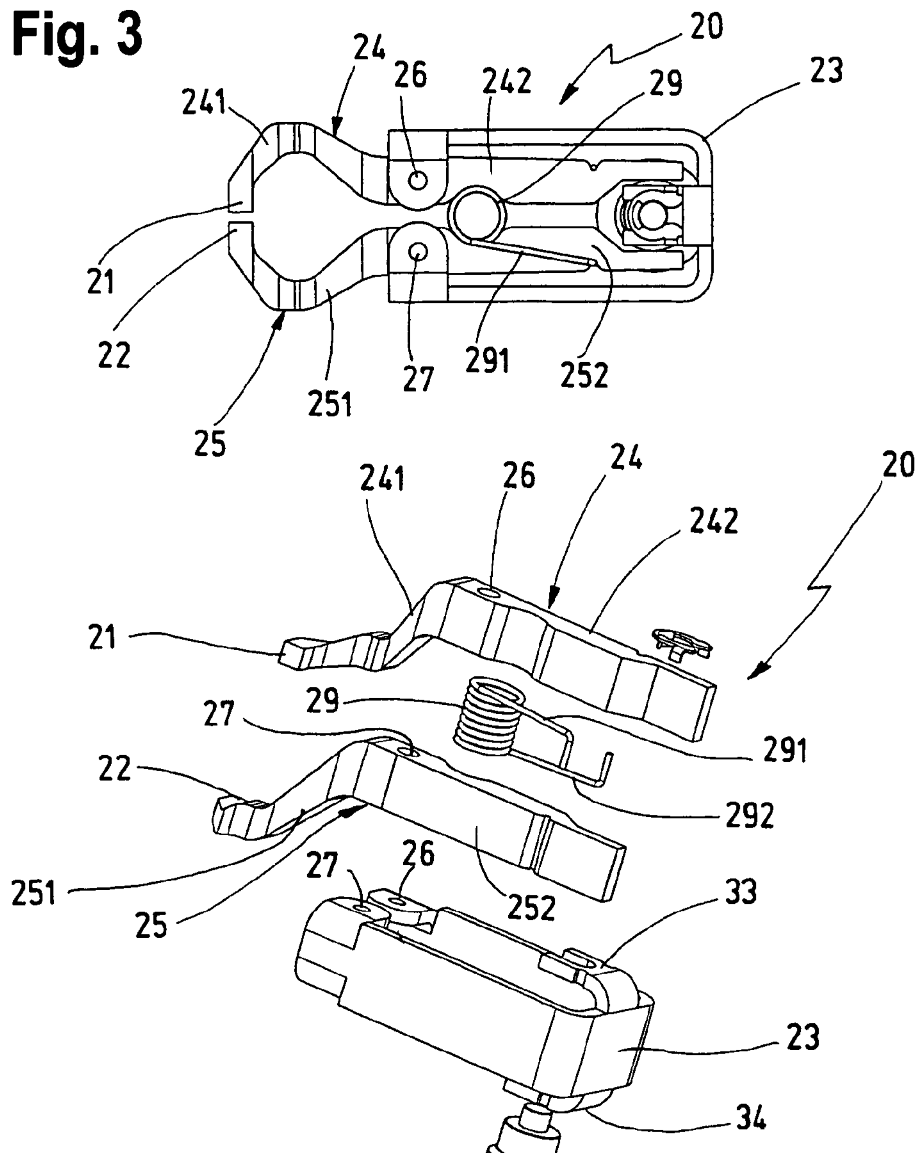
FIG. 3 is a top view of the guide device shown in FIG. 2.
FIG. 4 is an exploded view of the guide device shown in FIGS. 2 and 3.

FIG. 1 shows only one housing shell 111 of a machine housing 12 of a hand-guided power reciprocating saw. The housing 11 contains an electric motor and a transmission for driving a lifting rod 12 into a reciprocating stroke motion; the depiction of the motor and transmission has been omitted in FIG. 1. The lower end of the lifting rod 12 supports a clamping device 13 for clamping a saw blade 14. A base plate 15 is mounted to the underside of the machine housing 11 and serves to support the hand-guided power reciprocating saw on the work piece to be sawed and to guide the hand-guided power reciprocating saw during sawing.

The saw blade 14 has a row of saw teeth 141 pointing in the sawing direction and a saw blade spine 142 oriented away from them on which the saw blade 14 is supported by a support roller 16 during sawing. The support roller 16, which is situated between the legs of a support device 17, can impart an oscillating motion in the sawing direction to the saw blade 14 as needed through an oscillating movement of the support device 17.

In order to prevent a lateral deflection of the free end of the saw blade during sawing, which would result in unsatisfactory straight cuts or cuts that extend at an angle in the material depth of the work piece, a guide device 20 is provided, which has two guide elements 21, 22 that rest against opposite sides of the saw blade 14 and that guide and support the saw blade 14 in a largely play-free, low-sliding manner.

The guide device 20, which is shown in its installed position in FIG. 1 and is situated in the region behind the saw blade 14 in the sawing direction, is shown in detail in FIGS. 2 through 4. The guide device has a holder 23 and two two-armed pivot levers 24, 25 that are pivotably supported in the holder 23 and have front lever arms 241, 251 and rear lever arms 242 and 252. In FIGS. 3 and 4, the bearing points of the pivot levers 24, 25 in the holder 23 are labeled with the reference numerals 26 and 27. The holder 23 is designed to be attached in the machine housing 11, but can alternatively also be attached to the base plate 15. The two front lever arms 241, 251 of the pivot levers 24, 25 are embodied like tongs and at their free ends, each support one of the guide elements 21, 22. The two rear lever arms 242 and 252 of the pivot levers 24, 25 rest with frictional, nonpositive engagement against a locking cam 28 whose radius changes over its circumference. Preferably, the locking cam 28 has an oval cross section.

The frictional, nonpositive engagement of the ends of the rear lever arms 242 and 252 is produced by a spring force exerted by a torsion spring 29. The torsion spring 29 is situated in clothespin fashion, in the form of a helical spring close to the bearing points 26, 27 between the rear lever arms 242, 252 of the pivot levers 24, 25 and, with its spring legs 291 and 292, embraces the back sides of the rear lever arms 242, 252 oriented away from each other. Corresponding recesses are provided in the rear lever arms 242, 252 to securely fix the torsion spring 29 and its spring legs 291, 292.

The adjusting cam 28 is coupled to a knob 31 by means of a slip clutch or overload clutch 30. If the locking cam 28 is rotated by means of the knob 31, this changes the distance of the ends of the rear lever arms 242, 252 from each other. If this distance increases, then the distance of the guide elements 21, 22 at the ends of the front lever arms 241 and 251 decreases. If a saw blade is clamped in the clamping device 13 of the hand-guided power reciprocating saw, then at a particular rotation position of the adjusting cam 28, the two guide elements 21, 22 press against the saw blade 14 with a definite force that is predetermined by the slip clutch 30. The contact force is thus equal for all saw blades 14, independent of their blade thickness.

The knob 31 is embodied as hollow and cylindrical and accommodates the slip clutch 30, which is embodied in a known manner. The individual elements of the slip clutch 30 can be seen in the exploded view shown in FIG. 4. The adjusting cam 28 is comprised of a shaft segment of a one-piece shaft 32 that is supported-in rotary fashion in two support plates 33, 34 bent out from the holder 23.

The guide device 40 shown in FIGS. 5 through 8 with the guide elements 41, 42 for laterally guiding the saw blade 14 clamped in the clamping device 13 has a holder 43 and two two-armed pivot levers 44 and 45, each of which has a front lever arm 441 or 451 and a rear lever arm 442 or 452. The two pivot levers 44, 45 are supported in pivoting fashion at a shared bearing point 46 in the holder 43. The holder 43 is designed to be placed in the machine housing 11, in its region behind the saw blade 14 in the sawing direction, as can be inferred from the partial perspective depiction of the hand-guided power reciprocating saw shown in FIG. 5.

The guide elements 41, 42 are situated at the ends of the tong-shaped front lever arms 441 and 451 of the pivot levers 44, 45 and press against opposite sides of the saw blade 14 with spring-generated initial stress when a saw blade 14 is clamped into the clamping device 13. As is clear from the exploded depiction shown in FIG. 8, the guide elements 41, 42, which can be made of ceramic, for example, are produced in the form of separate shoes that are attached to the ends of the pivot levers 44, 45 by means of cylindrical screws 47. The rear lever arms 442, 452 of the pivot levers 44, 45 are each coupled by means of a pin/slot connection to a slider 48 that is guided so that it can slide in the holder 43 in its longitudinal direction. The slider 48 rests against a base plate 431 of the holder 43 and is laterally guided by two side walls 432, 433 protruding up from the base plate 431. The one side wall 433 is provided with an oblong hole 49 through which a bolt 50 fastened to the slider 48 passes; the bolt 50 protrudes from the side wall 433 and functions as a grasping part.

The bolt 50 is used to manually slide the slider 48 counter to the spring force of two compression springs 51 that extend in the longitudinal axis of the holder 43; these compression springs 51 rest against the slider 48 at one end and at the other end, rest against an end tab 434 bent out from the base plate 431. Each pin/slot connection between the pivot lever 44 or 45 and the slider 48 includes a pin 52 or 53 protruding at right angles from the end of the rear lever arm 442 or 452 and a slot 54 or 55 situated in the slider 48. The slots 54, 55 are aligned at an acute angle to each other so that their slot axes enclose an acute angle with each other that is preferably less than 10°. The slot axes approach each other in the direction of the bearing point 46 of the pivot levers 44, 45.

Figure 5:
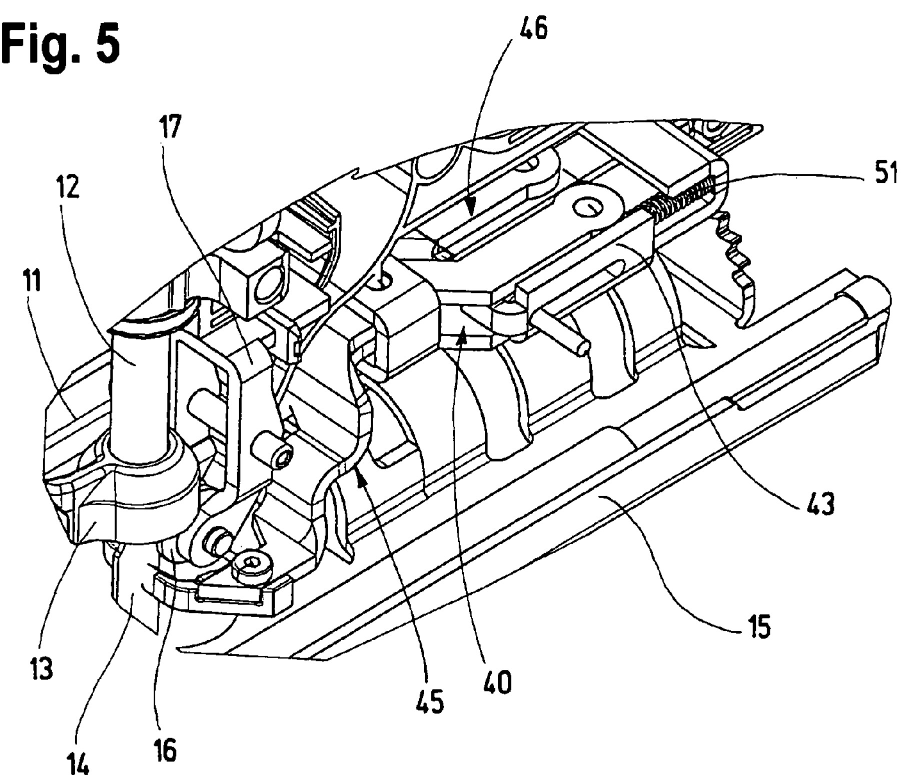
FIG. 5 shows a detail of a perspective depiction of a hand-guided power reciprocating saw with the housing open, having a guide device for the saw blade, according to a second exemplary embodiment.
Figure 6:
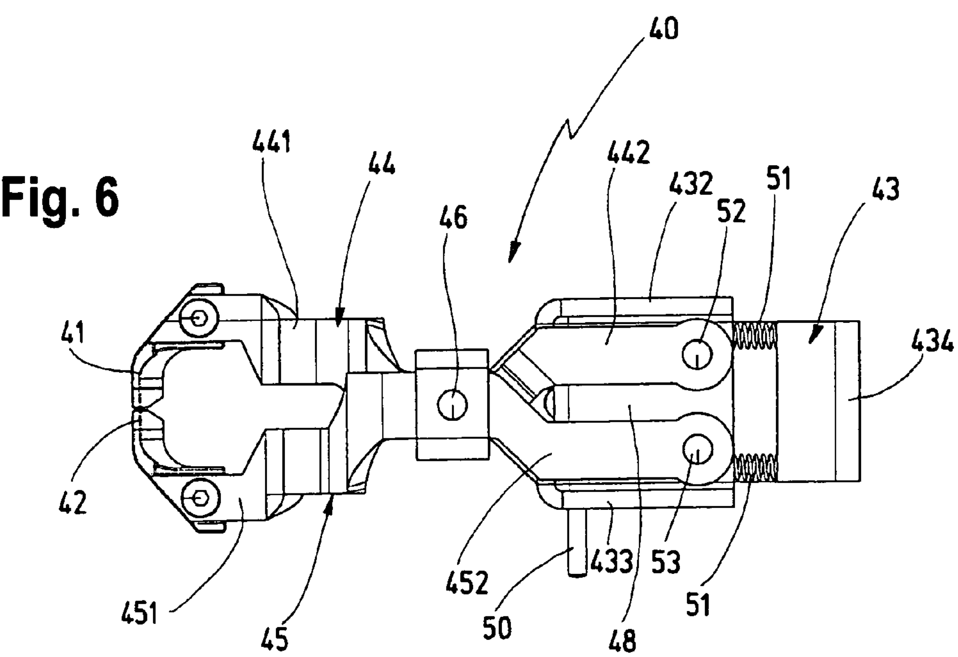
FIG. 6 is a top view of the guide device in the hand-guided power reciprocating saw according to FIG. 5.

The guide device 40 shown in the exploded depiction in FIG. 8 is shown in the assembled state in a top view in FIG. 6, in a side view in FIG. 7, and in a perspective view in FIG. 5 that shows the installation position in the machine housing 11. To change the saw blade 14 clamped in the clamping device 13 or to clamp a saw blade 14 into the clamping device 13, the guide device 40 is brought into a parked position in which the guide elements 41, 42 are spaced a maximum distance apart from each other and are lifted away from the saw blade 14. To reach this position, the bolt 50 is grasped and slid to the rear end of the oblong hole 49.

By compressing the compression springs 51, the bolt 50 slides the slider 48 toward the right in FIGS. 6 through 8, toward the end tab 434 of the holder 43. This causes the pins 52, 53 to travel toward the ends of the slots 24, 25, reducing their lateral spacing from each other, which causes the front lever arms 441, 451 of the pivot levers 44, 45 to pivot outward and the guide elements 41, 42 to move apart from each other. In this position of the slider 48, the bolt 50 is locked by a locking mechanism 57, which has a locking lever 56, for example, that is situated on the holder 43 and equipped with a locking hook 561, which engages the bolt 50.

If the new saw blade 14 is inserted into the clamping device 13, then this releases the locking mechanism 57 and the prestressed compression springs 51 slide the slider 48 toward the left in FIGS. 6 through 8. This causes the pins 52, 53 on the rear lever arms 442 and 452 of the pivot levers 44, 45 to travel into the rear region of the slots 54, 55, spreading the rear lever arms 442, 452 apart from each other. The spreading movement of the rear lever arms 442, 452 moves the front lever arms 441 and 451 toward each other and causes the guide elements 41, 42 to rest against the saw blade 14 with the spring force of the compression springs 51; this is true for all clamped saw blades 14, independent of their blade thickness.

If the saw blade 14 is subjected to a force that deflects the saw blade 14 laterally during sawing, then the respective guide element 21, 22 and the respective pivot lever 24, 25 transmit this force directly to the respective slot 52 or 53 in the slider 48. As a result of the slight inclination angle of the slots 24, 25 in relation to the longitudinal axis, which is approximately 5°, the force component along the respective slot 24 or 25 is not sufficient to cause the slider 48 to move. As a result, the contact of the guide elements 21, 22 against the saw blade 14 does not change and the holder 43 transmits the force to the machine housing 11.

It will be understood that each of the elements described above, or two or more together, may also find a useful application in other types of constructions differing from the types described above.

While the invention has been illustrated and described as embodied in a hand-guided power reciprocating saw, it is not intended to be limited to the details shown, since various modifications and structural changes may be made without departing in any way from the spirit of the present invention.

Without further analysis, the foregoing will reveal current knowledge, readily adapt it for various applications without omitting features that, from the standpoint of prior art, fairly constitute essential characteristics of the generic or specific aspects of the invention.

What is fully revela the gist of the present invention that others claimed as new and desired to be protected by Letters Patent is set forth in the appended claims.

The invention claimed is:

1. A hand-guided power reciprocating saw comprising:

a machine housing;

a saw blade drivable by a motor into a stroke motion;

a guide device having two guide elements resting against said saw blade at opposite sides of said saw blade and operative for guiding and supporting said saw blade crosswise to a sawing direction, said guiding device further having a two-armed pivot lever with lever arms on each of which a corresponding one of said guide elements is situated, said guiding device also having an adjusting mechanism for adjusting a transverse spacing between said guide elements; and a holder in which said guide device is integrated and which is configured to be mounted in said machine housing and/or to a base plate attached to said machine housing, said pivot lever being pivotally supported on said holder and said adjusting mechanism being accommodated in said holder, wherein:

said adjusting mechanism has a slider which is loaded by compression springs and is guided so that said slider is slidable inside said holder in a longitudinal direction, said lever arms of said pivot lever being oriented away from said guide elements and each coupled to said slider by a respective pin/slot connection wherein slots are inclined so that their slot axes enclose an acute angle oriented toward said guide elements, said compression springs being situated on a side of said slider oriented away from said guide elements and resting against said slider and against said holder;

said guide device has a locking mechanism for locking said slider in a park position in which said guide elements are spaced apart from said saw blade; and said locking mechanism has a bolt which protrudes from said slider crosswise to its sliding direction and simultaneously operates as a grasping part for manually sliding said slider and has a locking lever attached to said holder in a pivoting fashion, said locking lever having a locking hook which embraces said bolt in a parked position of said slider.

2. A hand-guided power as defined in claim 1, wherein said holder is fastened in a region behind said saw blade in a sawing direction.

* * * * *